UNITED STATES PATENT OFFICE.

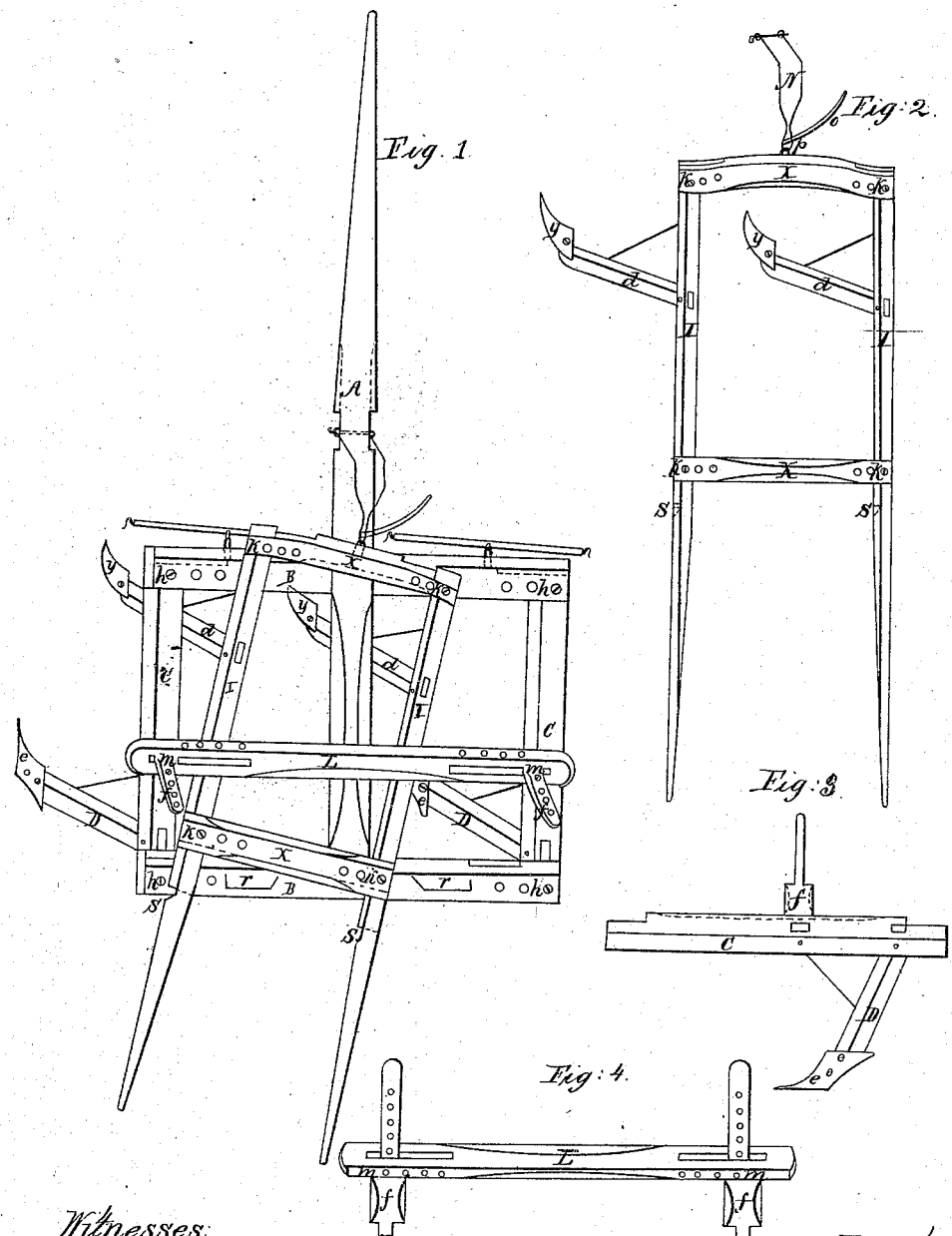

JOHN T. BEVER, OF BETHEL, ILLINOIS.

IMPROVEMENT IN CULTIVATORS.

Specification forming part of Letters Patent No. 48,358, dated June 27, 1865.

*To all whom it may concern:*

Be it known that I, JOHN T. BEVER, of Bethel, in the county of Morgan and State of Illinois, have invented a new and useful Improvement in Cultivators; and I do hereby declare that the following is a full, clear, and exact description thereof, reference being had to the accompanying drawings, making a part of this specification, of which—

Figure 1 is a perspective view of my invention, comprising all the parts. Fig. 2 is a detached view of the lever-handles in solid framing, with uprights, plow-blades, and pivot-ring, elevating-clevis, and clevis-guide attached thereto. Fig. 3 is also a detached view of side bar containing uprights and mold-board. Fig. 4 is a detached elevation of an adjustable guide-bar and uprights.

A is the beam or tongue, made permanent in cross-frames B B. C C are side bars, containing uprights D D and mold-boards $e\ e$, uprights or studs $f f$, and rods $g\ g$, as represented in Fig. 3. Said side bars, with their appendages, are adjustable and reversible by removing screws or bolts $h\ h\ h'h$, thereby enabling the operator to set his plows at any given distance apart or turning the soil to or from the growing corn. I I, the lever-handles, containing uprights $d\ d$ and plow-blades $y\ y$, are adjustable by bolts $k\ k$ in the ends of the cross-frames X X, operating, as described, in the outer frame above named. The uprights or studs $f f$ and guide-bar L, as represented in Fig. 4, are also adjustable by slots and bolts to correspond with side bars, C C, also being set to any desirable height by the aid of pins or bolts $m\ m$. The great use of this guide-frame will readily be seen. While its main office is to regulate the extent of movement in the lever-handle frame, it also serves as a strengthening-brace to the outward frame.

The elevating-clevis N and clevis-guide O and pivot-ring or staple P, as shown in Fig. 2, afford facilities to the operator to wield the plows (center ones) in either direction (to or from him) or to elevate or depress the same at will.

The features that somewhat distinguish this invention from others are, the handles being made in solid frame, the plows being connected thereto, (center ones,) the whole acting together upon a pivot in the center of the front cross-bar, X. The great leverage obtained by this arrangement enables the operator, by a gentle movement of the hand, to wield the plows in any direction, as also a slight depression of the hand upon the extreme end of the handles elevates the plows above the surface of the earth in cases of obstruction, uneven ground, or in turning around at the ends of the rows. A second feature is the elevating-clevis N, with its guide O, and the cleats or notches $r\ r$ on the upper face of the rear cross-bar, B, with corresponding notches $s\ s$ upon the under face of handles I I, affording facilities to elevate the forward plows above the surface and retain them in that position until the object for which they have been thrown up has been accomplished, the guide O retaining the relative position of the combined frames.

Having thus described my invention, what I claim, and ask to secure by Letters Patent, is—

1. The lever-handles I I, containing uprights $d\ d$, with cross-bars X X, made in solid framing to vibrate upon pivot P, in combination with beam or tongue A and clevis N.

2. The arrangement of the elevating-clevis N, clevis-guide O, cleats or notches $r\ r$, and corresponding notches $s\ s$, as and for the purposes herein specified.

JOHN T. BEVER.

Witnesses:
J. L. PRATT,
OLIVER DUCKETT.